Nov. 12, 1940.  J. W. FOLEY  2,221,512
BALL OR ROLLER BEARING
Filed June 12, 1939
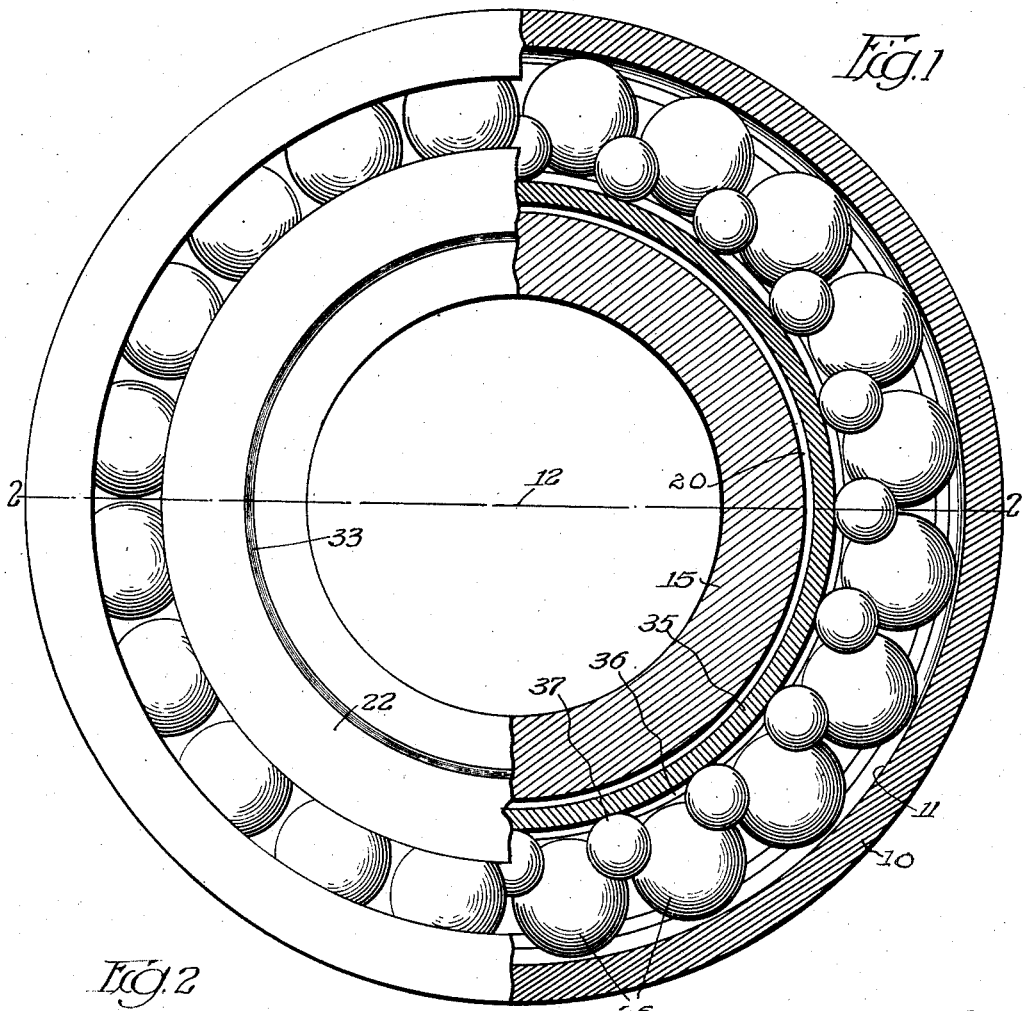
Fig. 1
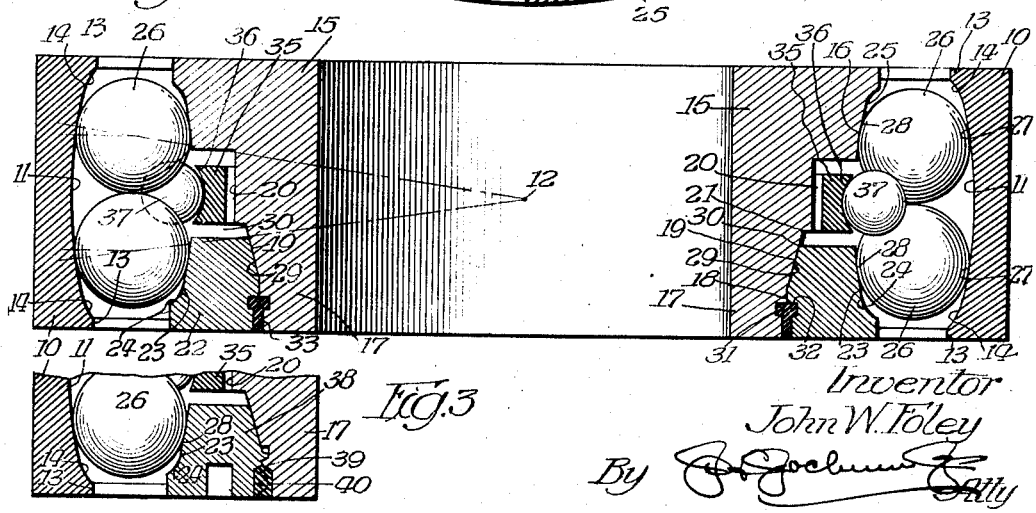
Fig. 2
Fig. 3
Inventor
John W. Foley Patented Nov. 12, 1940

2,221,512

UNITED STATES PATENT OFFICE 2,221,512

BALL OR ROLLER BEARING

John W. Foley, Chicago, Ill.

Application June 12, 1939, Serial No. 278,589

3 Claims. (Cl. 308—200)

This invention relates to improvements in antifriction bearings and more particularly to the construction of the same and in the manner in which the parts may be secured together, and one of the objects of the invention is to provide an adjustable self-aligning bearing in which the active points of contact of the balls or rollers with the bearing members is reduced to a minimum.

A further object is to provide in a bearing of this character roller or bearing surfaces which are uninterrupted and continuous from one side to the other, the extremities of such surfaces being curved and free from sharp corners or abrupt projections, whereby the rollers or balls will not be injured or marred, which would be the result if they did contact such abrupt formations by a relative lateral tilting of the inner and outer bearing rings one with respect to the other.

A further object is to provide an improved construction of bearing of this character in which the parts may be readily separated to permit access to the interior thereof, and improved means for maintaining the parts of the bearing in locked relation, thereby obviating a creeping or slipping of the parts of the bearing one with relation to the other.

A further object is to provide an improved bearing of this character which will be of a simple and durable construction, comparatively inexpensive to manufacture, and efficient and effective in operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating the invention, and in which Figure 1 is a view partly in side elevation, partly broken away, and partly in section of a bearing of this character constructed in accordance with the principles of this invention.

Figure 2 is a horizontal sectional view taken on line 2—2 Figure 1.

Figure 3 is a detail sectional view of a modified form or bearing.

Referring more particularly to the drawing the numeral 10 designates generally an annular outer bearing member of any desired size, the inner peripheral surface 11 of which is continuous from one side to the other side and such surface is preferably struck on an arc described from the center 12 of the member 10.

The surfaces 11 preferably terminate short of the lateral sides of the member 10, as at 13, and the surfaces 14 adjacent the sides 13 are formed on another arc so as to prevent the formation of abrupt shoulders at the junction of the surfaces 11 with the side portions 13.

The numeral 15 designates an inner annular bearing member having a bearing surface 16 formed on the outer periphery thereof adjacent one side of the member, while the opposite side of the member 16 is reduced, as at 17, to form a bearing surface 18 and a bearing surface 19. The central portion of the periphery of the member 15 is recessed, as at 20, and between the bottom of the recess 20 and the surface 19 there is provided a shoulder 21.

An annular bearing member 22 is provided with a bearing surface 23 and the outer extremity of the surface 23 is formed, as at 24, upon the same radius that the portion 25 of the bearing member 15 is formed. These surfaces 16—23 are formed upon a radius equal to the radius upon which the surfaces 11 are formed, but are opposed to the surface 11 so that balls 26 seated within the raceway formed between the outer ring 10 and the inner ring 15 will have reduced and single points of contact 27—28 respectively with the surfaces 11, 16 and 23.

The member 22 is preferably of a somewhat conical formation having a surface 29 which contacts the surface 19 and the member 22 is preferably of a length to terminate short of the shoulder 21 to provide a space 30 so that the member 22 may be forced into position and held by the surface 29 contacting the surface 19.

In order to prevent the bearing member 22 from being accidentally displaced with respect to the bearing member 15, locking means may be provided and to that end there may be provided an annular groove 31 opening through the peripheral face of the reduced portion 17 of the member 15. A similar groove or recess 32 opens through the inner peripheral face of the member 22 and these grooves 31—32 are disposed with respect to each other to form a seat.

A restricted entrance opening 33 to the seat is provided through the lateral face of the members 15 and 22 so that when these parts are assembled locking material 34, such as Babbitt metal or the like, may be poured thereinto.

When it is desired to remove the member 22 any suitable cutting tool or instrument may be employed for cutting through the restricted opening and the material in the seat 31—32 after which the member 22 may be readily removed.

Within the recess 20 formed by the assembled parts of the inner bearing ring is a floating inner bearing ring 35 having a bearing surface 36 formed on its outer periphery. Balls 37 engage the bearing surface 36 and are also disposed between adjacent balls 26.

In the form of the invention shown in Figure 3 the member 38 which corresponds to the member 22 is held in position by means of threads 39 on the periphery of the member 38 engaging threads 40 in the inner peripheral face of the member 17.

With this form of the invention it will be manifest that the parts may be readily assembled and access may be readily had to the interior of the bearing.

Furthermore the bearing surfaces for the rollers are constructed so that the balls will have only one-point contacts, the bearing surfaces being shaped to form clearance spaces beyond the points of contact so that in the event of any twisting or straining of the members 15, 22 and 10 one with respect to the other, the balls or rollers will not contact abrupt corners or surfaces which contact would tend to mar or injure the bearing.

Furthermore with this improved construction it will be manifest that there is provided a self-aligning bearing and the parts are so constructed that friction is reduced to a minimum.

While the preferred form of the invention has been herein shown and described, it is to be understood that various changes may be made in the details of construction and in the combination and arrangement of the several parts within the scope of the claims without departing from the spirit of this invention.

What I claim is:

1. In a roller bearing an outer ring having a curved bearing surface on its inner periphery extending substantially from one side to substantially the other side thereof, an inner ring embodying two ring members separably secured together, the outer periphery of the members of the inner ring being shaped to form bearing surfaces, the bearing faces of said member being formed on the same radius, balls between and contacting said bearing surfaces, each ball having a single point of contact with each of said surfaces, a floating inner ring bearing member, balls contacting said floating member and the adjacent first said balls, the outer extremities of said bearing surfaces being shaped to provide clearance space for the balls and being formed on an arc, and co-operating recesses in adjacent faces of the parts of the inner bearing member to form a seat for the reception of molten securing material, there being a restricted inlet to said seat.

2. In a bearing of the character described, an outer ring, an inner ring, rollers between said rings, the proximate faces of said rings being opposed and formed on arcs of the same radii, said rollers having one point contact with each of said rings, the other extremities of the surfaces with which the rollers contact being formed on radii to provide clearance spaces between the rollers and such surfaces to prevent formation of abrupt shoulders, a floating bearing ring encompassed by said rollers, smaller rollers disposed between the said floating ring and the first said rollers, the said inner ring being divided in a plane forming separate ring members, means separably securing said ring members together, and locking means for locking said ring members against relative movement, the said locking means comprising readily severable material housed within said rings.

3. In a bearing of the character described, an outer ring, an inner ring, rollers between said rings, the proximate faces of said rings being opposed and formed on arcs of the same radii, said rollers having one point contact with each of said rings, the other extremities of the surface with which the rollers contact being formed on radii to provide clearance spaces between the rollers and such surfaces to prevent formation of abrupt shoulders, a floating bearing ring encompassed by said rollers, smaller rollers disposed between the said floating ring and the first said rollers, the said inner ring being divided in a plane forming separate ring members, means separably securing said ring members together, and locking means for locking said ring members against relative movement, the said locking means comprising readily severable material housed within said rings, there being an entrance opening whereby access may be had to said locking means to sever the same.

JOHN W. FOLEY.